United States Patent
Nagamine et al.

(10) Patent No.: US 8,520,077 B2
(45) Date of Patent: Aug. 27, 2013

(54) COLOR-UNEVENNESS INSPECTION APPARATUS AND METHOD

(75) Inventors: Kunihiko Nagamine, Kanagawa (JP); Satoshi Tomioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 12/906,646

(22) Filed: Oct. 18, 2010

(65) Prior Publication Data

US 2011/0096191 A1 Apr. 28, 2011

(30) Foreign Application Priority Data

Oct. 28, 2009 (JP) ................................ 2009-248119

(51) Int. Cl.
| | | |
|---|---|---|
| *H04N 5/228* | (2006.01) | |
| *H04N 9/083* | (2006.01) | |
| *H04N 5/235* | (2006.01) | |
| *H04N 1/40* | (2006.01) | |
| *G03B 7/00* | (2006.01) | |
| *G06F 15/00* | (2006.01) | |
| *G06K 1/00* | (2006.01) | |
| *G06K 15/00* | (2006.01) | |
| *G06K 9/00* | (2006.01) | |

(52) U.S. Cl.
USPC ........ 348/189; 348/222.1; 348/272; 348/273; 348/274; 348/275; 348/276; 348/277; 348/278; 348/280; 348/362; 358/1.9; 358/2.1; 382/141; 382/142; 382/143; 382/144; 382/145; 382/146; 382/147; 382/148; 382/149; 382/150; 382/151; 382/152

(58) Field of Classification Search
USPC ...... 348/189, 182, 180, 131, 223.1, 272–279; 356/218, 229, 132
See application file for complete search history.

(56) References Cited

U.S. PATENT DOCUMENTS 4,963,828 A * 10/1990 Kawame et al. .............. 324/404
5,173,769 A 12/1992 Hashimoto
(Continued)

FOREIGN PATENT DOCUMENTS

JP 01-225296 9/1989
JP 1 225296 A 9/1989
(Continued)

OTHER PUBLICATIONS

Sony Corporation; EP Application No. 10013424.6, Extended European Search Report; Mar. 22, 2011; 6 pages.

*Primary Examiner* — Hai V Tran
*Assistant Examiner* — Akshay Doshi
(74) *Attorney, Agent, or Firm* — Dentons US LLP

(57) ABSTRACT

A color-unevenness inspection apparatus includes: an image pickup section picking up an image of an inspection target for a color-unevenness inspection; an image generation section generating an uneven-color image by determining one or more uneven-color regions existing in the picked-up image of the inspection target obtained by the image pickup section, and by classifying unit regions included in each of the uneven-color regions into a plurality of color groups; a calculation section calculating, on the uneven-color regions in the uneven-color image, an evaluation parameter to be used in the color-unevenness inspection; a correction section making a correction to the calculated evaluation parameter in consideration of a difference of color-unevenness visibility between the color groups; and an inspection section performing the color-unevenness inspection, based on a resultant evaluation parameter obtained by the correction.

10 Claims, 6 Drawing Sheets
(1 of 6 Drawing Sheet(s) Filed in Color)

(56) References Cited

U.S. PATENT DOCUMENTS

| | | |
|---|---|---|
| 6,747,619 B1 | 6/2004 | Tanahashi et al. |
| 2003/0169418 A1* | 9/2003 | Fujii et al. .................. 356/237.2 |
| 2007/0035556 A1* | 2/2007 | Hasegawa ..................... 345/591 |
| 2008/0299521 A1* | 12/2008 | Taylor et al. .................... 434/98 |
| 2009/0051907 A1 | 2/2009 | Li et al. |

FOREIGN PATENT DOCUMENTS

| | | |
|---|---|---|
| JP | 03-101583 | 4/1991 |
| JP | 03-291093 | 12/1991 |
| JP | 10-096681 | 4/1998 |

* cited by examiner

COLOR-UNEVENNESS INSPECTION APPARATUS AND METHOD

BACKGROUND OF THE INVENTION

1. Field of the Invention

The present invention relates to a color-unevenness inspection apparatus and method in which color unevenness of a color image or the like is inspected.

2. Description of the Related Art

Previously, for a color-unevenness inspection in a mass-production process for a display device that uses a Cathode Ray Tube (CRT), a Liquid Crystal Display (LCD) or the like capable of displaying a color image, a sensory test based on a comparison with a boundary sample has been mainly performed. This technique is carried out such that a display screen of the display device targeted for the inspection is directly viewed by a human being and therefore, this is an inspection close to actual use and also a simple and easy technique.

However, this technique relies largely upon the capabilities of individual inspectors and thus, quality of inspection varies depending on factors such as variations among the individual inspectors and the inspector's the degree of fatigue. Therefore, it is difficult to perform a stable inspection.

Under the circumstances, there have been proposed some techniques of objectively inspecting color unevenness without depending on the capability of the inspector. For example, there is a technique of inspecting color unevenness, by measuring a hue in each of plural points within a display screen by using a color imaging device or the like, in a state in which the entire display screen is set at white display. In this technique, the color unevenness is inspected according to the magnitude of a value representing a maximum color difference ($\Delta Euv^*$ or $\Delta Eab^*$) between a result of the measurement and a white display portion.

Specifically, for example, in Japanese Unexamined Patent Application Publications No. 01-225296, No. 03-101583 and No. 03-291093, a color and brightness at each of plural points within a display screen are measured, and the dispersion, a difference between a maximum value and a minimum value, and the like are standardized and used for a color-unevenness inspection. Further, for instance, in Japanese Unexamined Patent Application Publication No. 10-96681, attention is focused on the spatial size of an uneven color region and a region where a color is changed, and these are quantified and used for a color-unevenness inspection.

SUMMARY OF THE INVENTION

However, in the techniques of the above-described Japanese Unexamined Patent Application Publications No. 01-225296, No. 03-101583 and No. 03-291093, although a stable inspection can be expected by the objective color-unevenness inspection using the standardized parameters, there is such a problem that the degree of color unevenness felt by a human being also changes according to how the color unevenness spreads. In addition, similarly, in the technique of the above-described Japanese Unexamined Patent Application Publication No. 10-96681 as well, there is such a problem that the degree of color unevenness felt by a human being changes depending on the hue.

In other words, according to the techniques of the past, it is difficult to perform an appropriate color-unevenness inspection because human's color-unevenness visibility varies depending on the color and thus, there is room for improvement.

In view of the foregoing, it is desirable to provide a color-unevenness inspection apparatus and method capable of performing a color-unevenness inspection more appropriate than the techniques of the past.

According to an embodiment of the present invention, there is provided a color-unevenness inspection apparatus that includes: an image pickup section that picks up an image of an inspection target in a color-unevenness inspection; an image generation section that generates an uneven-color image by, in the picked-up image of the inspection target obtained by the image pickup section, identifying an uneven-color region and classifying unit regions included in each of the uneven-color regions into plural color groups; a calculation section that calculates, for the uneven-color region in the uneven-color image, an evaluation parameter to be used in the color-unevenness inspection; a correction section that subjects the calculated evaluation parameter to correction processing in consideration of a difference of color-unevenness visibility between the color groups; and an inspection section that performs the color-unevenness inspection based on the evaluation parameter after being subjected to the correction processing. Incidentally, as the evaluation parameter, there are, for example, "an uneven-color area ratio" that is a sum of individual area ratio of uneven-color regions in the respective color groups to the entire region of the inspection target, and "a maximum chroma" in the entire region of the uneven-color region.

According to another embodiment of the present invention, there is provided a color-unevenness inspection method that includes the steps of: obtaining a picked-up image of an inspection target in a color-unevenness inspection; generating an uneven-color image by, in the picked-up image, identifying an uneven-color region and classifying unit regions included in each the uneven-color regions into plural color groups; calculating, for the uneven-color region in the uneven-color image, an evaluation parameter to be used in the color-unevenness inspection; subjecting the calculated evaluation parameter to correction processing in consideration of a difference of color-unevenness visibility between the color groups; and performing the color-unevenness inspection, based on the evaluation parameter after being subjected to the correction processing.

In the color-unevenness inspection apparatus and the color-unevenness inspection method according to the embodiments of the present invention, the uneven-color image is generated by, in the picked-up image of the inspection target in the color-unevenness inspection, identifying the uneven-color region and classifying the unit regions included in the uneven-color regions into the plural color groups. Further, for the uneven-color region in this uneven-color image, the evaluation parameter to be used in the color-unevenness inspection is calculated, and the calculated evaluation parameter is subjected to the correction processing in consideration of the difference of color-unevenness visibility between the color groups. Subsequently, the color-unevenness inspection is performed based on the evaluation parameter after being subjected to the correction processing. Thus, as compared to the past techniques in which the color-unevenness inspection is performed without consideration of a difference of color-unevenness visibility depending on the color, there is realized an objective color-unevenness inspection that more closely matches the sense of a human being.

According to the color-unevenness inspection apparatus and the color-unevenness inspection method in the embodiments of the present invention, the uneven-color image is generated based on the picked-up image of the inspection target, the evaluation parameter for the uneven-color region in this uneven-color image is subjected to the correction processing in consideration of the difference of color-unevenness visibility between the color groups, and the color-unevenness inspection is performed based on the evaluation parameter after being subjected to the correction processing. Accordingly, as compared to the past techniques, it may be possible to realize an objective color-unevenness inspection that more closely matches the sense of a human being. Therefore, as compared to the past techniques, it may be possible to perform a more appropriate color-unevenness inspection.

Other and further objects, features and advantages of the present invention will appear more fully from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

An embodiment of the present invention will be described below in detail with reference to the drawings. Incidentally, the description will be provided in the following order.
1. Embodiment (an example of color-unevenness inspection processing in which correction processing according to a color in an uneven-color region is performed)
2. Modification

1. EMBODIMENT

Structure of Color-Unevenness Inspection Apparatus

Figure 1:
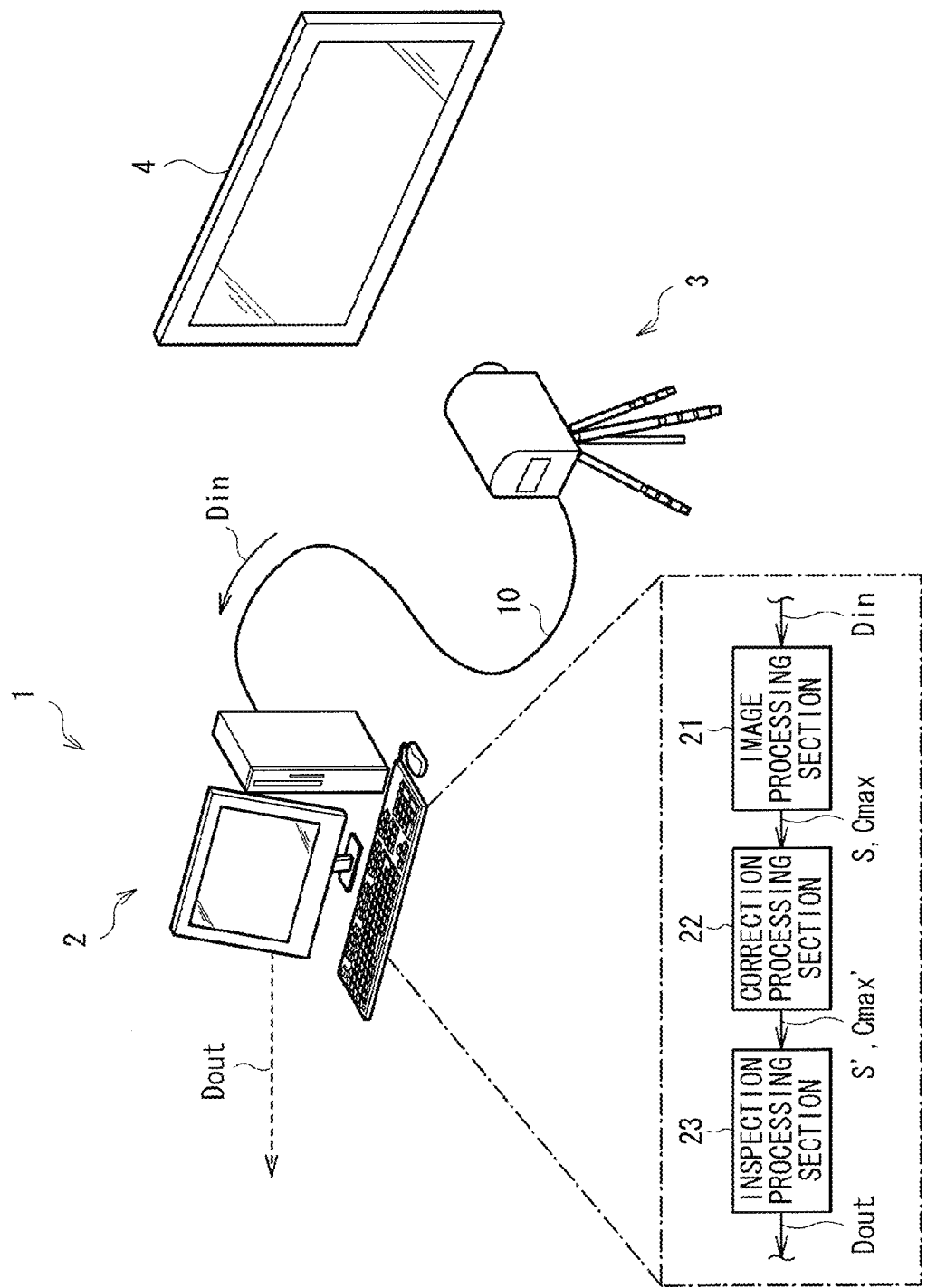
FIG. 1 is a diagram illustrating a schematic structure of a color-unevenness inspection apparatus according to an embodiment of the present invention, together with a display device serving as an inspection target.

FIG. 1 is a diagram illustration a schematic structure of a color-unevenness inspection apparatus (color-unevenness inspection apparatus 1) according to an embodiment of the present invention, together with a display device 4 serving as an inspection target. This color-unevenness inspection apparatus 1 performs an inspection of color unevenness on a color image displayed on the display device 4 or the like, and includes an image processing device 2 and an image pickup device 3 (image pickup section). Here, as the display device 4, various types of displays such as a CRT, an LCD, a Plasma Display Panel (PDP) and an organic Electro Luminescence (EL) display can be applied. Incidentally, a color-unevenness inspection method according to an embodiment of the present invention is realized in the color-unevenness inspection apparatus 1 of the embodiment and therefore, they will be described together as follows.

(Image Pickup Device 3)

The image pickup device 3 is used to pick up an image of a display screen (color display screen) of the display device 4 serving as an inspection target in a color-unevenness inspection. The image pickup device 3 includes an image sensor formed by a Charge Coupled Device (CCD), a Complementary Metal Oxide Semiconductor (CMOS), or the like. A picked-up image (picked-up-image data Din) obtained through the image pickup by the image pickup device 3 is output to the image processing device 2 via a connection wire 10. Incidentally, FIG. 1 illustrates a case where the connection wire 10 that is a cable is used, but the image pickup device 3 and the image processing device 2 may be wirelessly connected to each other.

(Image Processing Device 2)

The image processing device 2 performs the color-unevenness inspection based on the picked-up-image data Din output from the image pickup device 3, and outputs inspection result data Dout as a result of the inspection. The image processing device 2 is configured by using, for example, a Personal Computer (PC) as illustrated in FIG. 1. The image processing device 2 includes an image processing section 21, a correction processing section (correction section) 22 and an inspection processing section (inspection section) 23. Incidentally, the image processing section 21 corresponds to a specific example of the "image generation section" and the "calculation section" according to the embodiment of the present invention.

The image processing section 21 performs predetermined image processing based on the picked-up-image data Din, thereby generating (calculating) an uneven-color area ratio S and a maximum chroma Cmax each of which is a specific example of an evaluation parameter used in the color-unevenness inspection described later. Specifically, first, in the picked-up image configured by the picked-up-image data Din, an uneven-color region is identified, and the contents of the identified uneven-color region are classified on a display pixel (unit region) basis into plural color groups, so that an uneven-color image that will be described later is generated. Subsequently, for the uneven-color region in this uneven-color image, the uneven-color area ratio S and the maximum chroma Cmax are calculated. Incidentally, the image processing in this image processing section 21 will be described later in detail.

The correction processing section 22 subjects each of the uneven-color area ratio S and the maximum chroma Cmax calculated by the image processing section 21 to correction processing in consideration of a difference of human's color unevenness visibility between the above-mentioned color groups. In other words, the correction processing section 22 performs both the correction processing for the uneven-color area ratio S and the correction processing for the maximum chroma Cmax. As a result, an uneven-color area ratio S' after the correction processing and a maximum chroma Cmax' after the correction processing are generated. Incidentally, the correction processing in this correction processing section 22 will also be described later in detail.

Based on the uneven-color area ratio S' and the maximum chroma Cmax' after the correction processing output by the correction processing section 22, the inspection processing section 23 performs the color-unevenness inspection for the display screen of the display device 4 serving as the inspection target, and outputs the inspection result data Dout as a result of the inspection. Specifically, for example, based on a color-unevenness comprehensive evaluation value E (comprehensive evaluation value) obtained through a weighted summation of the uneven-color area ratio S' and the maximum chroma Cmax', the inspection processing section 23 performs the color-unevenness inspection. Incidentally, color-unevenness inspection processing in the inspection processing section 23 will also be described later in detail.

[Actions and Effects of Color-Unevenness Inspection Apparatus]

Subsequently, actions and effects of the color-unevenness inspection apparatus 1 according to the embodiment will be described.

(Basic Operation)

In the color-unevenness inspection apparatus 1, when the display screen of the display device 4 serving as an inspection target is imaged by the image pickup device 3, a picked-up image (picked-up-image data Din) is obtained. This picked-up-image data Din is input into the image processing section 21 in the image processing device 2 via the connection wire 10.

Based on this picked-up-image data Din, the image processing section 21 performs predetermined image processing that will be described below, thereby calculating each of the uneven-color area ratio S and the maximum chroma Cmax each of which is an evaluation parameter used in the color-unevenness inspection. Next, the correction processing section 22 subjects each of the uneven-color area ratio S and the maximum chroma Cmax to the correction processing in consideration of the difference in terms of color-unevenness visibility which will be described below, thereby generating the uneven-color area ratio S' and the maximum chroma Cmax' after the correction processing. Subsequently, based on these uneven-color area ratio S' and maximum chroma Cmax', the inspection processing section 23 performs the color-unevenness inspection for the display screen of the display device 4 serving as the inspection target. As a result, the inspection result data Dout is output by the inspection processing section 23 as a result of the inspection.

(Details of Color-Unevenness Inspection Processing)

Figure 2:
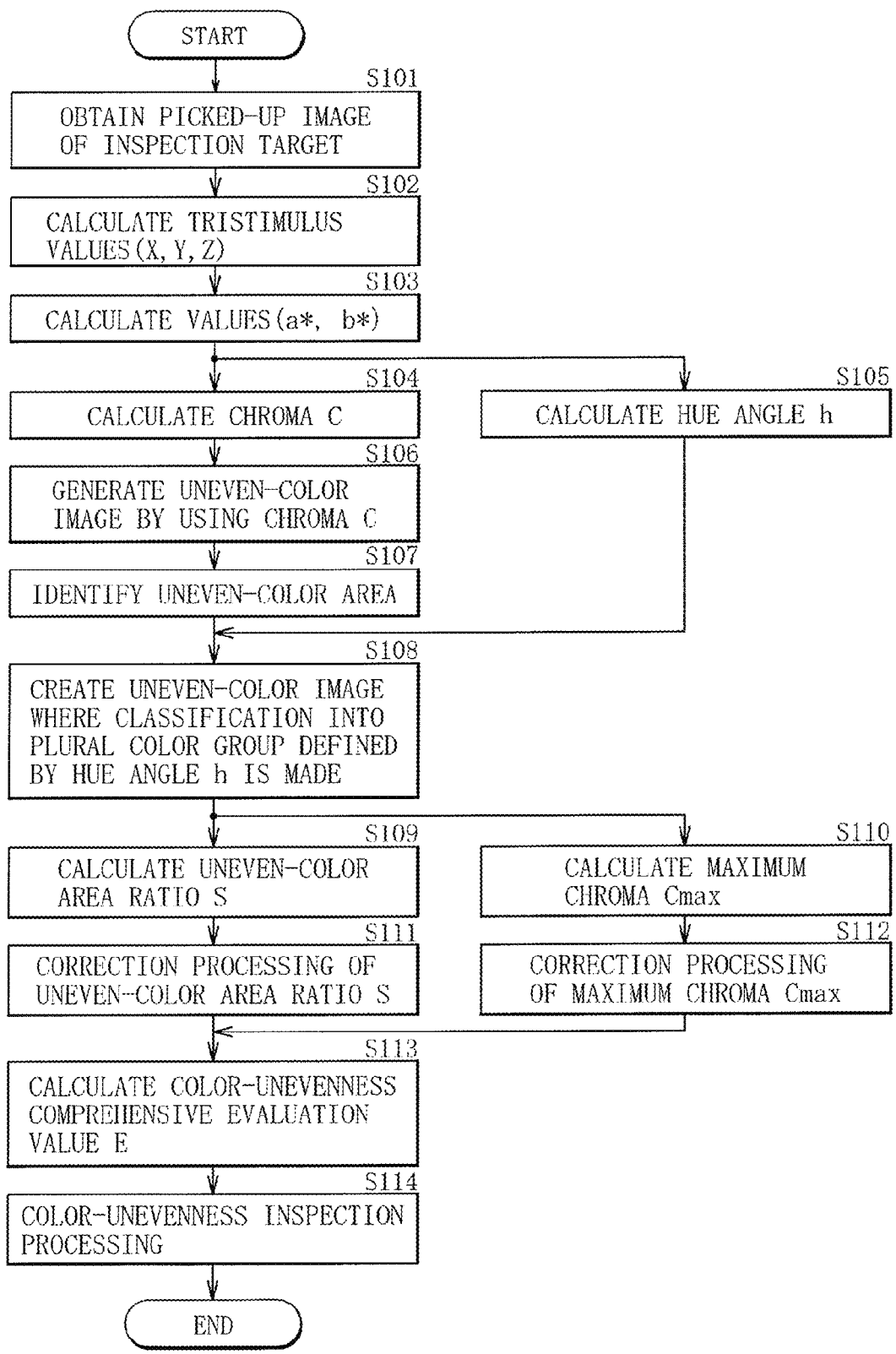
FIG. 2 is a flowchart representing an example of color-unevenness inspection processing performed in the image processing device illustrated in FIG. 1.

Next, there will be described details of the color-unevenness inspection processing by the image processing device 2, which is one of features of the color-unevenness inspection apparatus 1 in the embodiment. FIG. 2 illustrates an example of the color-unevenness inspection processing performed in the image processing device 2, in the form of a flowchart.

First, as mentioned above, the image processing section 21 obtains the picked-up image (picked-up-image data Din) of the inspection target from the image pickup device 3 via the connection wire 10 (step S101).

Subsequently, the image processing section 21 converts a signal of the picked-up-image data Din into a signal (Xi, Yi, Zi) formed by tristimulus values X, Y, and Z (step S102). Specifically, for example, when the picked-up-image data Din is a video signal in sRGB standard, conversion is performed by using the following equation (1). Further, when the picked-up-image data Din is a video signal in other standard, the signal (Xi, Yi, Zi) is generated by similarly performing conversion in accordance with such a standard. Incidentally, although the case where the picked-up-image data Din is converted into the signal (Xi, Yi, Zi) is described here, the signal (Xi, Yi, Zi) may be directly obtained by the image pickup device 3.

$$\begin{bmatrix} X_i \\ Y_i \\ Z_i \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad (1)$$

(when picked-up-image data Din is in sRGB standard (based on IEC 61966-2-1))

Next, based on this signal (Xi, Yi, Zi), the image processing section 21 calculates values (a*, b*) in the CIE 1976 L*a*b* color space (CIELAB color space) recommended by the Commission Internationale de l'Éclairage (CIE) in 1976 (step S103). Incidentally, this CIELAB color space is recommended as a uniform color space and is a space in consideration of uniformity with respect to human's visual perception of colors. Here, specifically, the image processing section 21 calculates the values (a*, b*) by using the following equations (2) and (3), per display pixel. Incidentally, Xn, Yn and Zn in these equations are tristimulus values of a perfect reflecting diffuser that targets D65.

$$\begin{cases} a^* = 500\left\{(X_i/X_n)^{\frac{1}{3}} - (Y_i/Y_n)^{\frac{1}{3}}\right\} & (2) \\ b^* = 200\left\{(Y_i/Y_n)^{\frac{1}{3}} - (Z_i/Z_n)^{\frac{1}{3}}\right\} & (3) \end{cases}$$

Subsequently, based on the calculated values (a*, b*), the image processing section 21 calculates a chroma C for each display pixel by using the following equation (4) (step S104), and also calculates a hue angle h for each display pixel by using the following equation (5) (step S105).

$$\begin{cases} C = \{(a^*)^2 + (b^*)^2\}^{\frac{1}{2}} & (4) \\ h = \tan^{-1}(b^*/a^*) & (5) \end{cases}$$

Figure 3A:
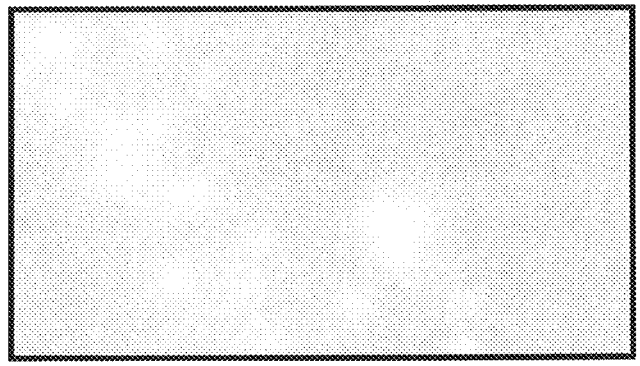
FIGS. 3A, 3B and 3C are diagrams each representing an example of an image created in the color-unevenness inspection processing.

Next, by using the calculated chroma C, the image processing section 21 generates an uneven-color image from the picked-up image described above (step S106). In other words, the image processing section 21 generates the uneven-color image formed by values each representing the chroma C of each display pixel. As a result, for example, an uneven-color image formed by uneven-color image data D1 as shown in FIG. 3A is generated.

Figure 3B:
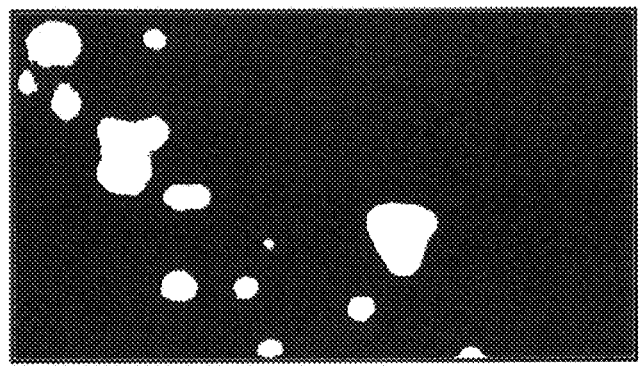

Subsequently, the image processing section 21 identifies, in the generated uneven-color image (uneven-color image data D1), an uneven-color region based on the degree of the chroma C in each display pixel (step S107). Specifically, the image processing section 21 identifies the uneven-color region by determining, for each display pixel whose value representing the chroma C is equal to or above a predetermined threshold, that the display pixel belongs to the uneven-color region, while determining, for each display pixel whose value representing the chroma C is less than the threshold, that the display pixel does not belong to the uneven-color region. As a result, for example, as shown in an uneven-color image (uneven-color image data D2) in FIG. 3B, the uneven-color region is identified. Incidentally, in the uneven-color image illustrated in FIG. 3B, the uneven-color region is displayed in white, while a region other than the uneven-color region is displayed in black, i.e. this is a binarized image.

Figure 3C:
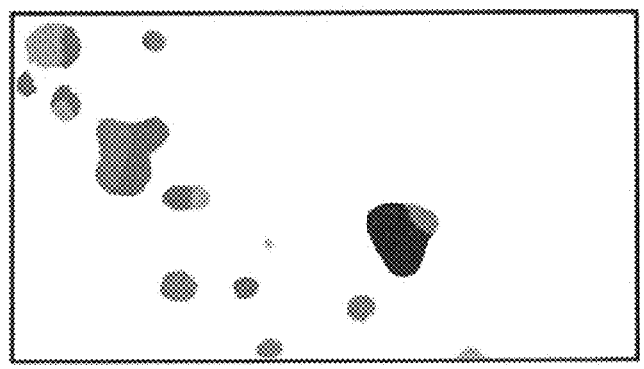

Next, the image processing section 21 generates an uneven-color image formed by uneven-color image data D3, by classifying the unit regions included in each of the uneven-color regions in the uneven-color image formed by the uneven-color image data D2 into plural color groups (step S108). Here, each of these color groups is defined according to the magnitude in the hue angle h. In other words, by use of the value representing the hue angle h in each display pixel calculated in step S105, the display pixels within the uneven-color region are classified into the plural color groups. As a result, for example, like an uneven-color image (the uneven-color image data D3) illustrated in FIG. 3C, the uneven-color image including the uneven-color region whose unit regions are classified into the plural color groups is generated.

Figure 4A:
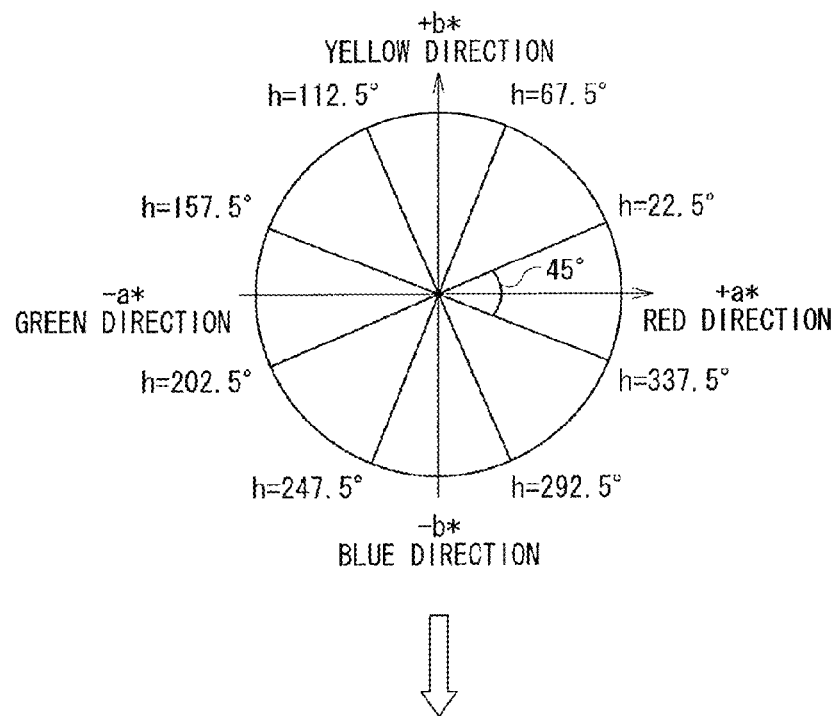
FIG. 4 is a schematic diagram for describing an example of plural color groups defined by the hue angle.
Figure 4B:
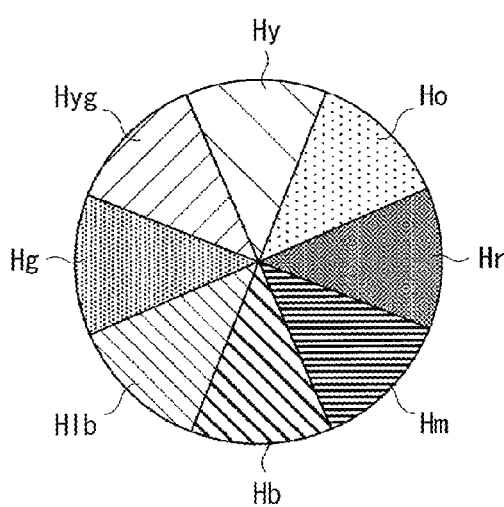

Here, specifically, for example, as illustrated in Part (A) and Part (B) of FIG. 4, plural (eight in this example) color groups Hr, Ho, Hy, Hyg, Hg, Hlb, Hb and Hm are each defined according to the magnitude in the hue angle h. For instance, here, the color group Hr corresponding to red (R)-based colors is a region of $337.5° \leq h \leq 22.5°$, and the color group Ho corresponding to orange (O)-based colors is a region of $22.5° \leq h \leq 67.5°$. The color group Hy corresponding to yellow (Y)-based colors is a region of $67.5° \leq h \leq 112.5°$, and the color group Hyg corresponding to yellowish green (YG)-based colors is a region of $112.5° \leq h \leq 157.5°$. The color group Hg corresponding to green (G)-based colors is a region of $157.5° \leq h \leq 202.5°$, and the color group Hlb corresponding to light blue (LB)-based colors is a region of $202.5° \leq h \leq 247.5°$. The color group Hb corresponding to blue (B)-based colors is a region of $247.5° \leq h \leq 292.5°$, and the color group Hm corresponding to magenta (M)-based colors is a region of $292.5° \leq h \leq 337.5°$.

Incidentally, the number of color groups into which the classification is made according to the magnitude in the hue angle h, and the position of each region are not limited to the example in Part (A) and Part (B) of FIG. 4. The classification may be made into, for example, four or twelve color groups.

Next, based on the generated uneven-color image (uneven-color image data D3), the image processing section 21 calculates the uneven-color area ratio S (step S109) and also calculates the maximum chroma Cmax (step S110). Here, the uneven-color area ratio S is a sum of individual area ratio of the uneven-color regions in the respective color groups described above to the entire region of the inspection target (a region corresponding to all the display pixels within the display screen), and the uneven-color area ratio S is defined by the following equation (6). Incidentally, signs Sr, So, Sy, Syg, Sg, Slb, Sb and Sm in the equation (6) represent the individual area ratio of the uneven-color regions in the respective color groups Hr, Ho, Hy, Hyg, Hg, Hlb, Hb and Hm, respectively. On the other hand, the maximum chroma Cmax is a maximum chroma in the entire uneven-color region.

$$S = \sum (Sr, So, Sy, Syg, Sg, Slb, Sb, Sm) \quad (6)$$
$$= (Sr + So + Sy + Syg + Sg + Slb + Sb + Sm)$$

Subsequently, the correction processing section 22 subjects the calculated uneven-color area ratio S to the correction processing (first correction processing), thereby determining the uneven-color area ratio S' after the correction processing (step S111). Further, at the same time, the correction processing section 22 subjects the calculated maximum chroma Cmax to the correction processing (second correction processing), thereby determining the maximum chroma Cmax' after the correction processing (step S112).

Figure 5:
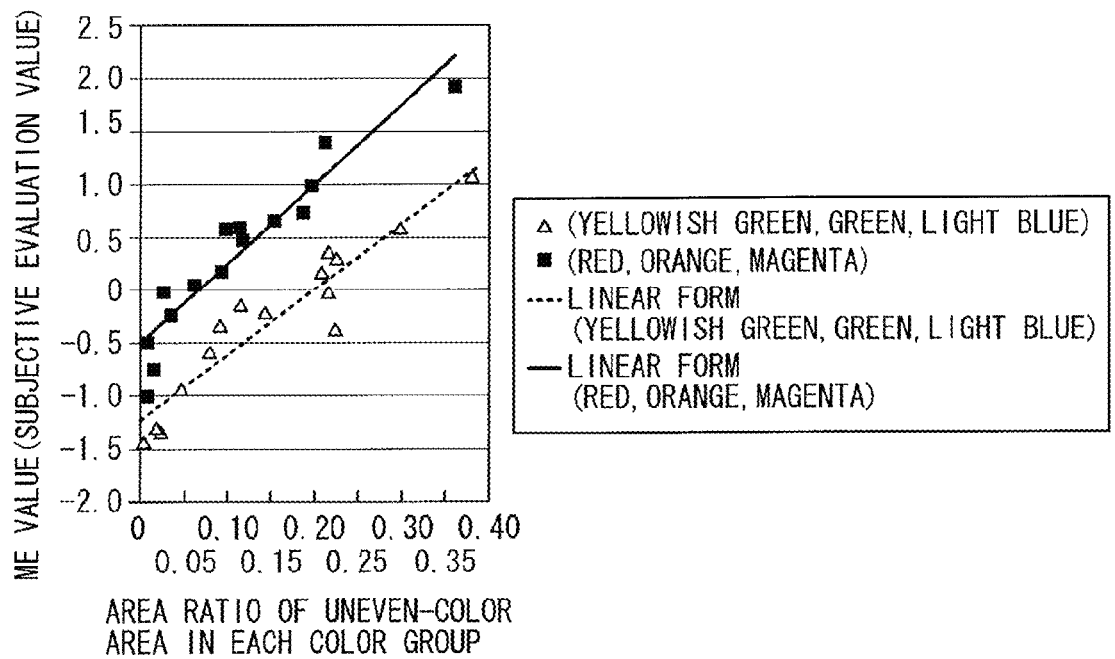
FIG. 5 is a characteristic diagram representing an example of a relation per color group between an individual area ratio of an uneven-color region and a subjective evaluation value of color unevenness.

The uneven-color area ratio S is subjected to the correction processing for the following reason. The extent to which a human senses color unevenness (color-unevenness visibility) varies depending on the kinds of colors forming the color unevenness. Specifically, for example, as illustrated in FIG. 5, the color-unevenness visibility (ME value: subjective evaluation value of color unevenness perceived by a human being) varies depending on the individual area ratio of the uneven-color region of each color group. In other words, here, in the area ratio Sr of the color group Hr corresponding to red (R)-based colors, the area ratio So of the color group Ho corresponding to orange (O)-based colors and the area ratio Sm of the color group Hm corresponding to magenta (M)-based colors, as compared to the area ratio Syg of the color group Hgy corresponding to yellowish green (YG)-based colors, the area ratio Sg of the color group Hg corresponding to green (G)-based colors and the area ratio Slb of the color group Hlb corresponding to light blue (LB)-based colors, the ME value (color-unevenness visibility) is higher at the same value representing the area ratio.

Figure 6:
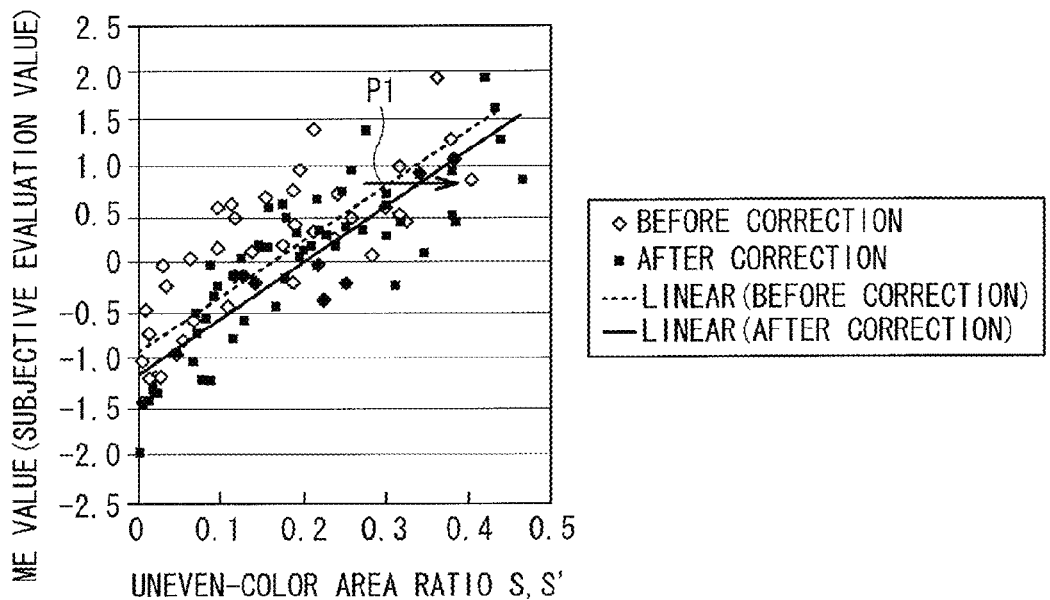
FIG. 6 is a characteristic diagram representing an example of correction processing of an uneven-color area ratio in the color-unevenness inspection processing.

Thus, in the embodiment, the correction processing section 22 subjects the uneven-color area ratio S to the correction processing in consideration of the differences of human's color-unevenness visibility among such color groups, thereby generating the uneven-color area ratio S' after the correction processing. Specifically, the correction processing section 22 subjects the individual area ratio of the uneven-color region in each color group to the correction processing so that the differences in the ME value (color-unevenness visibility) according to the individual area ratio among the color groups are reduced (to be zero desirably). Thus, for example, as indicated by a sign P1 in FIG. 6, the uneven-color area ratio S is subjected to the correction processing and therefore the uneven-color area ratio S' after the correction processing is generated. To be more specific, here, the area ratios Sr, Sm and So of the uneven-color regions in the color groups Hr, Hm and Ho corresponding to the red (R)-based colors, the magenta (M)-based colors and the orange (O)-based colors, respectively, in which the respective ME values (color-unevenness visibility) are relatively high, are selectively subjected to the correction processing. In other words, such correction processing of the uneven-color area ratio S is expressed by, for example, the following equation (7). Incidentally, a variable a in the equation (7) represents a correction value (offset correction value) used in the correction processing of the uneven-color area ratio S.

$$S' = \Sigma(Sr, So, Sm) + a + \Sigma(Sy, Syg, Sg, Slb, Sb)$$

(when $\Sigma(Sr, So, Sm) > 0$, $0 < |a| \leq 1$, when $\Sigma(Sr, So, Sm) = 0$, $a = 0$) (7)

Figure 7:
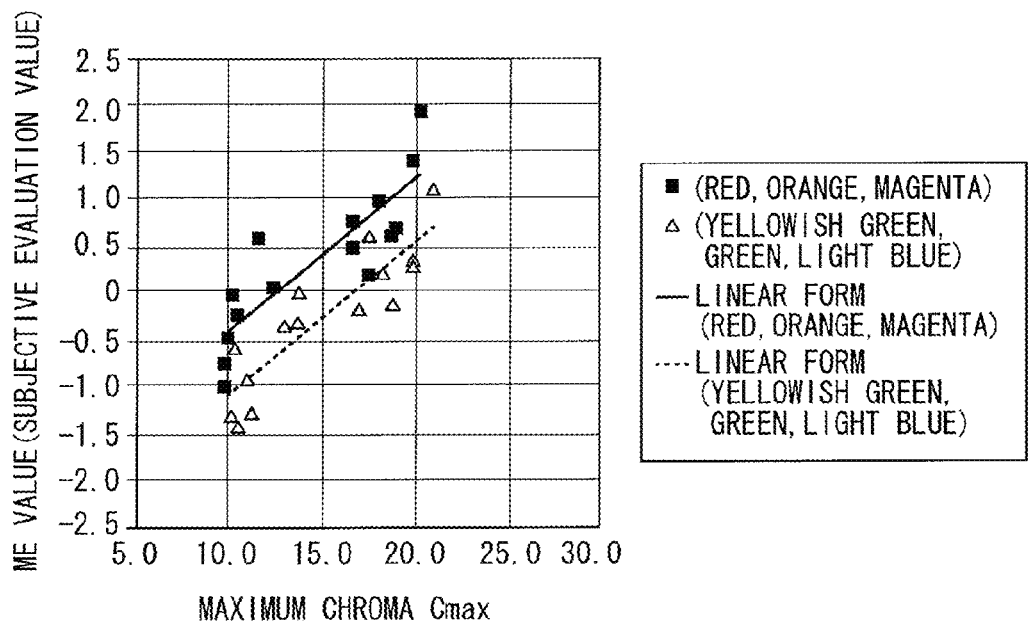
FIG. 7 is a characteristic diagram representing an example of a relation between a maximum chroma and a subjective evaluation value of color unevenness in the uneven-color region.

Further, similarly, the maximum chroma Cmax is subjected to the correction processing, because the extent to which a human senses color unevenness (color-unevenness visibility) varies depending on the types of colors forming the color unevenness. Specifically, for example, as illustrated in FIG. 7, the color-unevenness visibility (ME value: subjective evaluation value of color unevenness perceived by a human being) varies depending on the color group to which a color indicating the maximum chroma Cmax belongs. In other words, here, when a color that belongs to the color group Hr corresponding to red (R)-based colors, the color group Ho corresponding to orange (O)-based colors or the color group Hm corresponding to magenta (M)-based colors indicates the maximum chroma Cmax, as compared to a case in which a color that belongs to the color group Hyg corresponding to yellowish green (YG)-based colors, the color group Hg corresponding to green (G)-based colors or the color group Hlb corresponding to light blue (LB)-based colors indicates the maximum chroma Cmax, the ME value (color-unevenness visibility) is higher at the same value representing the maximum chroma Cmax.

Figure 8:
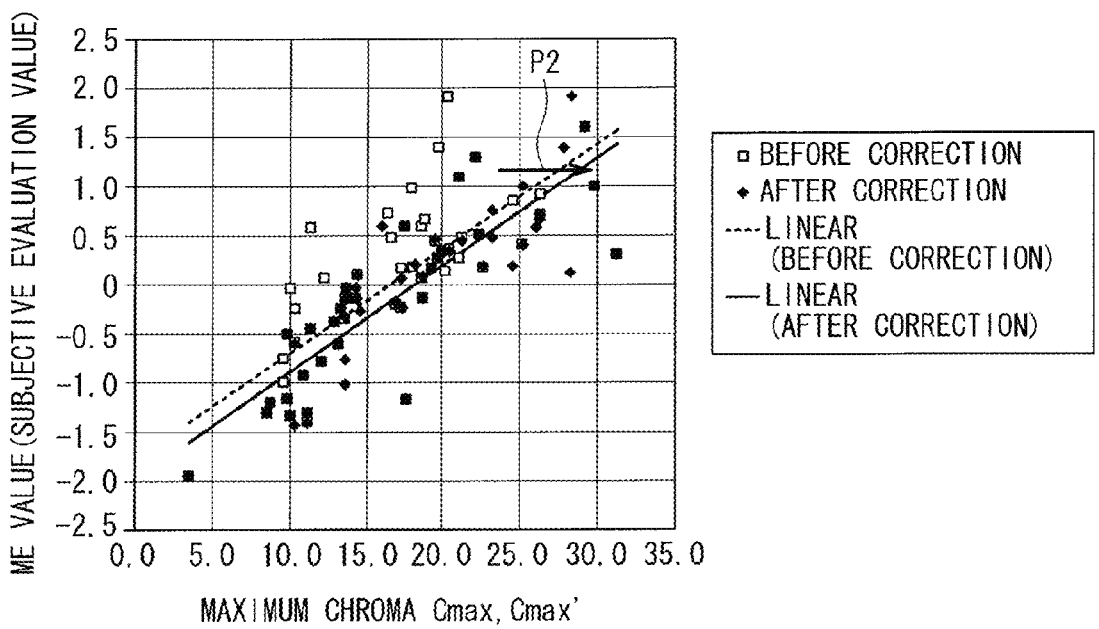
FIG. 8 is a characteristic diagram representing an example of correction processing of the maximum chroma in the color-unevenness inspection processing.

Thus, in the embodiment, the correction processing section 22 subjects the maximum chroma Cmax also to the correction processing in consideration of the differences of human's color-unevenness visibility among such color groups, thereby generating the maximum chroma Cmax' after the correction processing. Specifically, the correction processing section 22 performs the correction processing according to the color group to which the color indicating the maximum chroma Cmax belongs, so that the differences in the ME value (color-unevenness visibility) according to the maximum chroma Cmax among the color groups are reduced (to be zero desirably). Thus, for example, as indicated by a sign P2 in FIG. 8, the maximum chroma Cmax is subjected to the correction processing and therefore the maximum chroma Cmax' after the correction processing is generated. To be more specific, here, when the color that indicates the maximum chroma Cmax belongs to the color groups Hr, Hm and Ho corresponding to the red (R)-based colors, the magenta (M)-based colors and the orange (O)-based colors, respectively, in which the respective ME values (color-unevenness visibility) are relatively high, the correction processing is selectively performed. In other words, such correction processing of the maximum chroma Cmax is expressed by, for example, the following equation (8). Incidentally, a variable b in the equation (8) represents a correction value (gain correction value) used in the correction processing of the maximum chroma Cmax.

$$C\text{max}' = b \times C\text{max}$$

(when Cmax is a value in red, orange and magenta regions, $0 < b < 5$)

(where $b \neq 1$)

when Cmax is a value in other region, $b=1$ (8)

In this way, by performing the correction processing of the uneven-color area ratio S and the correction processing of the maximum chroma Cmax, the color-unevenness inspection in consideration of the differences of human's color-unevenness visibility among the color groups is realized.

Subsequently, based on the thus-determined uneven-color area ratio S' and maximum chroma Cmax' after the correction processing, by using, for example, the following equation (9), the inspection processing section 23 calculates the color-unevenness comprehensive evaluation value E (comprehensive evaluation value) to be used in the color-unevenness inspection (step S113). In other words, through a weighted summation of the uneven-color area ratio S' and the maximum chroma Cmax', the color-unevenness comprehensive evaluation value E is calculated. As a result, in the color-unevenness inspection that will be described below, it may be possible to perform the inspection in which the weighting of the uneven-color area ratio S' and the maximum chroma Cmax' is reflected. Incidentally, each of constants k1 and k2 in the equation (9) represents a weighting coefficient.

$$E = (k1 \times S' + k2 \times C\text{max}')$$ (9)

Next, based on the color-unevenness comprehensive evaluation value E thus determined, the inspection processing section 23 performs the color-unevenness inspection for the display screen of the display device 4 serving as the inspection target, thereby generating the inspection result data Dout as a result of the inspection (step S114). Specifically, for example, it is determined that the larger the color-unevenness comprehensive evaluation value E, the larger the degree of color unevenness in the inspection target, while it is determined that the smaller the color-unevenness comprehensive evaluation value E, the smaller the degree of color unevenness in the inspection target. Alternatively, it is determined that when the color-unevenness comprehensive evaluation value E is equal to or above a predetermined threshold, the inspection target is defective, while it is determined that when the color-unevenness comprehensive evaluation value E is less than the predetermined threshold, the inspection target is not defective. This completes the color-unevenness inspection processing by the image processing device 2.

In the embodiment as described above, in the picked-up image (picked-up-image data Din) of the inspection target, the uneven-color image (uneven-color image data D3) is generated by identifying the uneven-color region and classifying the display pixels within the uneven-color region into the plural color groups; the evaluation parameter (uneven-color area ratio S and the maximum chroma Cmax) to be used in the color-unevenness inspection is calculated for the uneven-color region of this uneven-color image; the evaluation parameter is subjected to the correction processing in consideration of the differences of color-unevenness visibility among the color groups; and the color-unevenness inspection is performed, based on the evaluation parameter after being subjected to this correction processing. Therefore, as compared to the past techniques in which the color-unevenness inspection is performed without consideration of the difference of color-unevenness visibility depending on the color, it may be possible to realize an objective color-unevenness inspection that more closely matches a sense of a human being. Accordingly, it may be possible to perform a color-unevenness inspection more appropriate than those in the past.

Further, since the objective color-unevenness inspection that more closely matches the sense of a human being is realized, it may be possible to improve the efficiency of development and design, by using the inspection for quality evaluation in development and design stages.

Furthermore, by introducing the color-unevenness inspection of the embodiment in, for example, an inspection process in mass production of products, it may be possible to perform a stable and swift color-unevenness inspection, thereby enabling improvement in efficiency of the inspection process and stabilization of product quality.

2. MODIFICATION

The present invention has been described above by using the embodiment, but the present invention is not limited to this embodiment and can be modified in various ways.

For example, in the above-described embodiment, there has been described the case where the correction processing of the uneven-color area ratio S and the correction processing of the maximum chroma Cmax are both performed, but the present invention is not limited to this case. In other words, for example, only either one of the correction processing of the uneven-color area ratio S and the correction processing of the maximum chroma Cmax may be performed.

Further, in the above-described embodiment, there has been described the case where the uneven-color area ratio S and the maximum chroma Cmax are employed as the evaluation parameter used in the color-unevenness inspection. However, in addition to (or in place of) them, other evaluation parameters may be used.

Furthermore, in the above-described embodiment, there has been described the case where the inspection target of the color-unevenness inspection is the display screen of the display device that displays a color image. However, the inspection target of the present invention may be any device (for example, a lighting device (a backlight or the like) capable of emitting color light) other than the display device.

Moreover, in the above-described embodiment, there has been described the case where the image pickup device 3 and the image processing device 2 are separate from each other in the color-unevenness inspection apparatus 1. However, these devices may be provided within the same device.

Still furthermore, the series of processes described in the embodiment may be performed in hardware (circuit) or software (program).

The present application contains subject matter related to that disclosed in Japanese Priority Patent Application JP 2009-248119 filed in the Japan Patent Office on Oct. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A color-unevenness inspection apparatus comprising:
an image pickup configured to pick up an image of an inspection target for a color-unevenness inspection;
an image generator configured to generate an uneven-color image by determining one or more uneven-color regions existing in the picked-up image of the inspection target obtained by the image pickup, and by classifying unit regions included in each of the uneven-color regions into a plurality of color groups;
a calculator configured to calculate, on the uneven-color regions in the uneven-color image, an evaluation parameter to be used in the color-unevenness inspection;
a corrector configured to make a correction to the calculated evaluation parameter in consideration of a difference of color-unevenness visibility between the color groups; and
an inspector configured to perform the color-unevenness inspection, based on a resultant evaluation parameter obtained by the correction,
wherein the evaluation parameter includes an uneven-color area ratio defined as a sum of individual area ratio and includes a maximum chroma defined as a maximum value of chroma in a whole of the uneven-color regions, the individual area ratio being a ratio of an region value of the uneven-color region for each of the color groups to an region value of an entire region to be inspected.

2. a color-unevenness inspection apparatus comprising:
an image pickup configured to pick up an image of an inspection target for a color-unevenness inspection;
an image generator configured to generate an uneven-color image by determining one or more uneven-color regions existing in the picked-up image of the inspection target obtained by the image pickup, and by classifying unit regions included in each of the uneven-color regions into a plurality of color groups;
a calculator configured to calculate, on the uneven-color regions in the uneven-color image, an evaluation parameter to be used in the color-unevenness inspection;
a corrector configured to make a correction to the calculated evaluation parameter in consideration of a difference of color-unevenness visibility between the color groups; and an inspector configured to perform the color-unevenness inspection, based on a resultant evaluation parameter obtained by the correction,
wherein,
the evaluation parameter includes an uneven-color area ratio defined as a sum of individual area ratio and includes a maximum chroma defined as a maximum value of chroma in a whole of the uneven-color regions, the individual area ratio being a ratio of an region value of the uneven-color region for each of the color groups to an region value of an entire region to be inspected, and
the corrector is configured to perform at least one of a first correction and a second correction, the first correction being a process in which the uneven-color area ratio is corrected through correcting the individual area ratio for each of the color groups so that the difference of color-unevenness visibility between the color groups is reduced, and the second correction being a process in which the maximum chroma is corrected, in a manner depending on the color group of a color of the maximum chroma, so that the difference of color-unevenness visibility between the color groups is reduced, where the color-unevenness visibility has a dependence on the individual area ratio as well as the maximum chroma.

3. The color-unevenness inspection apparatus according to claim 2, wherein the corrector is configured to perform both the first correction and the second correction.

4. The color-unevenness inspection apparatus according to claim 3, wherein the inspector is configured to perform the color-unevenness inspection based on a comprehensive evaluation value obtained as a weighted summation of the corrected uneven-color area ratio as a resultant of the first correction and the corrected maximum chroma as a resultant of the second correction.

5. The color-unevenness inspection apparatus according to claim 4, wherein the inspector is configured to determine that
the larger the comprehensive evaluation value, the larger a degree of color unevenness in the inspection target, and
the smaller the comprehensive evaluation value, the smaller the degree of color unevenness in the inspection target.

6. The color-unevenness inspection apparatus according to claim 2, wherein
the corrector, in the first correction, is configured to correct the uneven-color area ratio by selectively correcting the individual area ratio of the uneven-color region in the color group of red (R)-based colors, magenta (M)-based colors or orange (O)-based colors, and
the corrector, in the second correction, is configured to selectively correct the maximum chroma, when a color of the maximum chroma belongs to the color group of the red (R)-based colors, magenta (M)-based colors or orange (O)-based colors.

7. The color-unevenness inspection apparatus according to claim 1, wherein each of the plurality of color groups is defined according to a magnitude in a hue angle.

8. The color-unevenness inspection apparatus according to claim 1, wherein the image generator is configured to determine the uneven-color region in the picked-up image based on a degree of a chroma in each unit region.

9. The color-unevenness inspection apparatus according to claim 1, wherein the inspection target is a display screen in a display device that displays a color image.

10. A color-unevenness inspection method comprising the steps of:
- picking up an image of an inspection target for a color-unevenness inspection via an image pickup;
- generating an uneven-color image by determining one or more uneven-color regions existing in the picked-up image, and by classifying unit regions included in each of the uneven-color regions into a plurality of color groups via an image generator;
- calculating, on the uneven-color regions in the uneven-color image, an evaluation parameter to be used in the color-unevenness inspection via a calculator;
- making a correction to the calculated evaluation parameter based on a difference of color-unevenness visibility between the color groups via a corrector; and
- performing the color-unevenness inspection based on a resultant evaluation parameter obtained by the correction via an inspector,
- wherein the evaluation parameter includes an uneven-color area ratio defined as a sum of individual area ratio and includes a maximum chroma defined as a maximum value of chroma in a whole of the uneven-color regions, the individual area ratio being a ratio of an region value of the uneven-color region for each of the color groups to an region value of an entire region to be inspected.

* * * * *